United States Patent [19]

Takizawa

[11] 4,444,504
[45] Apr. 24, 1984

[54] DISPLACEMENT MEASURING INSTRUMENT
[75] Inventor: Kinji Takizawa, Kawasaki, Japan
[73] Assignee: Mitutoyo Mfg. Co., Ltd., Tokyo, Japan
[21] Appl. No.: 256,034
[22] Filed: Apr. 21, 1981
[30] Foreign Application Priority Data Jul. 21, 1980 [JP] Japan .................. 55-102944[U]

[51] Int. Cl.³ ............................................. G01B 11/04
[52] U.S. Cl. .................................. 356/374; 33/125 C
[58] Field of Search ...................... 356/373, 374, 375; 33/125 A, 125 C; 250/237 G

[56] References Cited

U.S. PATENT DOCUMENTS

| 2,043,625 | 6/1936 | Linder | 33/125 A |
| 3,714,446 | 1/1973 | Kittredge | 250/237 G |
| 4,051,367 | 9/1977 | Sayce | 356/373 |
| 4,250,381 | 2/1981 | Yoshiike et al. | 250/237 G |

Primary Examiner—R. A. Rosenberger
Attorney, Agent, or Firm—Koda and Androlia

[57] ABSTRACT

A displacement measuring instrument wherein the instrument comprises a main scale and a carriage movable along the main scale having thereon mounted an index scale whose graduated surface is opposed through a minute space to a graduated surface of said main scale, and a value of relative displacement between the main scale and the carriage is measured from a variation in volume of a light emitted to the main scale and the index scale and transmitted therethrough or reflected thereat due to the relative movement between the scales, is of such an arrangement that at least part of travel guide mechanisms for said carriage comprises a groove formed in the moving direction of the carriage on either the graduated surface of said main scale or the outer surface of the carriage opposed to said graduated surface and convex guide means solidly secured to the rest of the abovementioned surfaces and guided in travel by the groove. With the abovedescribed arrangement, a stabilized travel guide performance can be obtained only by use of the graduated surface of the main scale without using the side face of the main scale as the scanning reference surface of the carriage.

9 Claims, 7 Drawing Figures

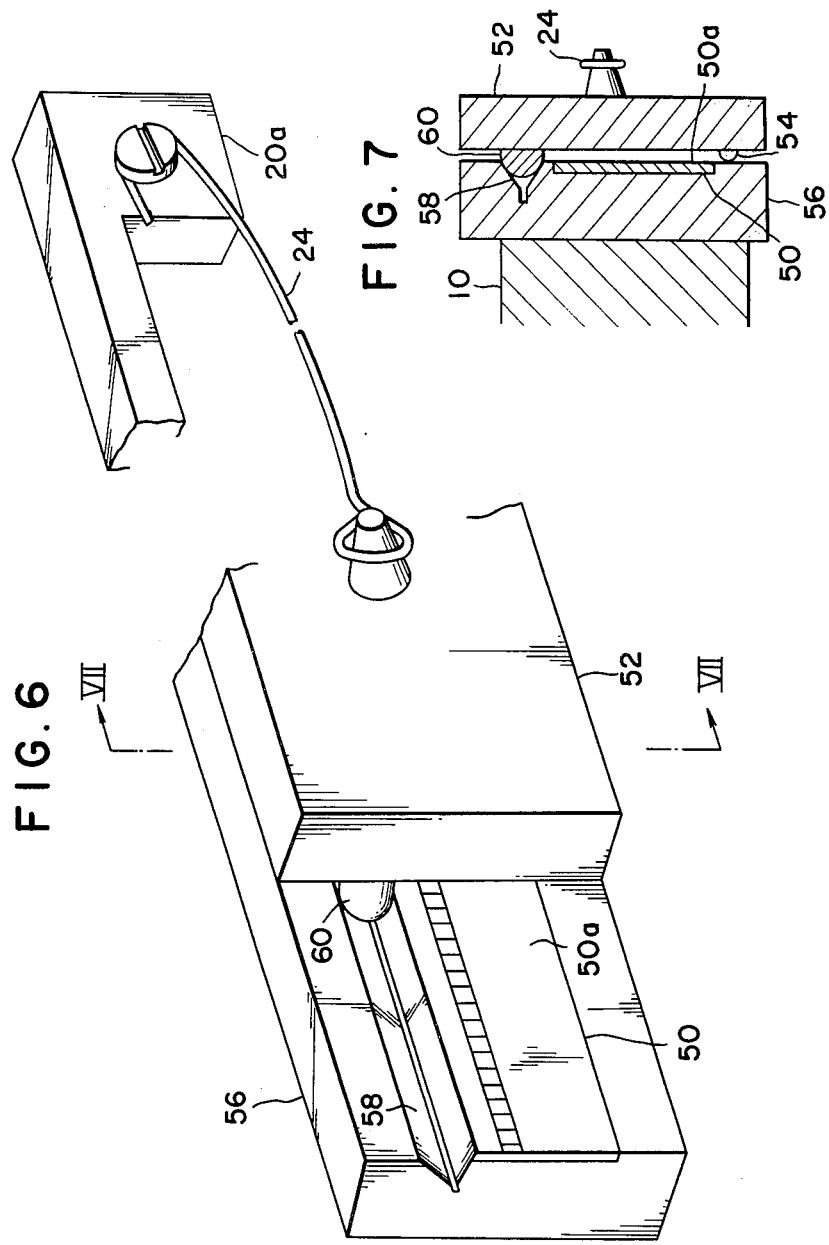

DISPLACEMENT MEASURING INSTRUMENT

BACKGROUND OF THE INVENTION

1. Field of the Invention

This invention relates to displacement measuring instruments, and more particularly to improvements in a displacement measuring instrument wherein said instrument comprises a main scale and a carriage movable along said main scale having thereon mounted an index scale whose graduated surface is opposed through a minute space to a graduated surface of said main scale, and a value of relative displacement between the main scale and the carriage is measured from a variation in volume of a light emitted to the main scale and the index scale and transmitted therethrough or reflected thereat due to the relative movement between the scales.

2. DISCRIPTION OF THE PRIOR ART

In general, in a displacement measuring instrument for measuring a length or the like of a product, in the case a value of movement is measured between relatively movable bodies, for example a value of movement of a measuring element with respect to its main body, there has been known to be used a linear scale type displacement measuring instrument in which a detector including a main scale is fixed to one body and a carriage having mounted thereon an index scale is fixed to the other body, and a value of relative displacement between the main scale and the detector is photoelectrically read.

The linear scale type displacement measuring instrument as described above, such as a transmitting linear scale type displacement measuring instrument is of such an arrangement shown in FIGS. 1 through 3. Referring to the drawings, designated at 10 is a hollow cylindrical aluminum casing having a substantially rectangular hollow cross section, formed by cold drawing for example, which is fixed to one of members, relative positions of which are to be measured, 12 a transmitting type glass linear main scale, the lower end of which is received in a longitudinal groove 10a formed in the hollow casing 10, and elastically bonded to the hollow casing 10 through a rubber rod 14 and an elastomeric bonding agent 16 such as silicon rubber, 20 a detecting portion fixed to the other of the members, ralative positions of which are to be measured, 22 a carriage connected to an arm 20a formed at the lower portion of the detecting portion 20 through connecting means formed of a cantilever spring 24, one end of which is fixed on the arm 20a and the other end of which is annularly attached to a conical projection 23 for example, and movable along the main scale 12 in such a condition that the carriage is biased in the direction of abutting against the outer surface of the main scale 12 by the cantilever spring 24, 26 light emitting elements disposed on the carriage 22, 28 an index scale fixed on the carriage 22, 30 photoelectric elements disposed on the side opposite to the light emitting elements 26 disposed on the carriage 22 and receiving the light which has been emitted from the light emitting elements 26 and transmitted through a graduation 12a of the main scale 12 and a graduation of the index scale 28, 32 and 33 sliders constituting travel guide mechanisms for maintaining a predetermined value of interval between a graduated surface 12b or a side face 12c of the main scale 12, which serves as a scanning reference surface of the carriage 22, 34 a belt-like steel tape for preventing dust and the like from entering the hollow casing 10 from outside, and 36 magnets embedded in the hollow casing 10 for attracting the steel tape 34.

In the conventional transmitting linear scale type displacement measuring instrument as described above, if a relative movement occurs in a direction perpendicular to the paper surface in FIG. 1 between the hollow casing 10 fixed to one of two members movable relative to each other and the detecting portion 20 fixed to the other member, then the light emitted from the light emitting elements 26 and transmitted through the graduations of the index scale 28 and of the main scale 12 varies in transmitting volume, whereby the variation in transmitting volume is detected by the photoelectric elements 30, so that a value of relative movement between the hollow casing 10 and the detecting portion 20 can be measured.

The linear scale type displacement measuring instrument as described above has a characteristic feature of that a value of relative displacement between two objects can be measured with a high accuracy. However, with the conventional linear scale type displacement measuring instrument, the scanning reference surface of the carriage 22 has included the graduated surface 12b of the main scale 12 and the side face 12c of the main scale perpendicular to the graduated surface 12b. Consequently, in order to improve the measuring accuracy, it was necessary not only to finely finish the graduated surface 12b which has been finished finely in general, but also to finish the side face 12c of the main scale to render a high straightness thereto, whereby the side face 12c of the main scale is accurately in parallel to the graduation 12a. However, in actual practice, it is difficult to finely finish the side face 12c of the main scale 12, and, even if it would be possible, considerable increase in production cost would follow. Particularly, in the case the side face 12c of of the main scale 12 is engaged with the carriage 22 through the sliders 33 as in the example of the prior art, not only the straightness but also very low surface roughness are required for the side face 12c of the main scale, thus increasing the cost to a great extent.

SUMMARY OF THE INVENTION

It is therefore the primary object of the present invention to provide a displacement measuring instrument wherein a stabilized travel guide performance can be obtained only by use of the graduated surface of the main scale without using the side face of the main scale as the scanning reference surface of the carriage and to eliminate necessity of finishing the side face of the main scale.

It is another object of the present invention to provide a displacement measuring instrument wherein the accuracy in travel of the carriage can be improved by the stabilized travel guide performance.

It is a further object of the present invention to provide a displacement measuring instrument with suitable travel guide mechanism whereby a stabilized travel guide performance can be obtained only by use of the graduated surface of the main scale as the scanning reference surface of the carriage.

It is a still further object of the present invention to provide a transmitting linear scale type displacement measuring instrument with simple travel guide mechanisms whereby a stabilized travel guide performance can be obtained only by use of the graduated surface of the transmitting type linear main scale as the scanning reference surface of the carriage.

It is a yet further object of the present invention to provide a reflecting linear scale type displacement measuring instrument with simple travel guide mechanisms whereby a stabilized travel guide performance can be obtained only by use of the graduated surface of the reflecting type linear main scale as the scanning reference surface of the carriage.

One of the above described objects can be achieved by an arrangement according to the present invention that in a displacement measuring instrument wherein the instrument comprises a main scale and a carriage movable along the main scale having thereon mounted an index scale whose graduated surface is opposed through a minute space to a graduated surface of the main scale, and a value of relative displacement between the main scale and the carriage is measured from a variation in volume of a light emitted to the main scale and the index scale and transmitted therethrough or reflected thereat due to the relative movement between the scales, at least part of travel guide mechanisms for the carriage comprises a groove formed in the moving direction of the carriage on either the graduated surface of the main scale or the outer surface of the carriage opposed to the graduated surface and convex guide means solidly secured to the rest of the abovementioned surfaces and guided in travel by said groove.

Further, one of the above described objects can be achieved by an arrangement according to the present invention that part of the travel guide mechanisms comprises a V-groove formed on the graduated surface of the main scale and a guide rod being of a semicircle in cross section solidly secured to the outer surface of the carriage opposed to the graduated surface of the main scale.

Further, one of the above described objects can be achieved by an arrangement according to the present invention that part of the travel guide mechanisms comprises a groove being of a semicircle in cross section formed on the outer surface of the carriage opposed to the graduated surface of the main scale and a guide rod being of a circle in cross section solidly secured to the graduated surface of the linear scale.

Further, one of the above described objects can be achieved by an arrangement according to the present invention that the guide rod is half inserted into a groove formed on the graduated surface of the main scale, and solidly secured to the graduated surface of the main scale through a bonding agent filled in the groove.

Further, one of the above described objects can be achieved by an arrangement according to the present invention that in a displacement measuring instrument wherein the instrument comprises a transmitting type linear main scale and a carriage movable along the main scale having thereon mounted an index scale whose graduated surface is opposed through a minute space to a graduated surface of the main scale, and a value of relative displacement between the main scale and the carriage is measured from a variation in volume of a light emitted to the main scale and the index scale and transmitted therethrough due to the relative movement between the scales, travel guide mechanisms of the carriage includes: a first travel guide mechanism having sliders solidly secured to the carriage and slidable on the graduated surface of the main scale; and a second travel guide mechanism having a V-groove formed on the graduated surface of the main scale in the moving direction of the carriage and a guide rod being of a semicircle in cross section solidly secured to the outer surface of the carriage opposed to the graduated surface of the main scale and guided in travel by the V-groove.

Further, one of the above described objects can be achieved by an arrangement according to the present invention that in a displacement measuring instrument wherein said instrument comprises a transmitting type linear main scale and a carriage movable along the main scale having thereon mounted an index scale whose graduated surface is opposed through a minute space to a graduated surface of the main scale, and a value of relative displacement between the main scale and the carriage is measured from a variation in volume of a light emitted to the main scale and the index scale and transmitted therethrough due to the relative movement between the scales, travel guide mechanism of the carriage includes: a first travel guide mechanism having solidly secured to the carriage and slidable on the graduated surface of the main scale; and a second travel guide mechanism having a groove being of a semicircle in cross section formed on the outer surface of the carriage opposed to the graduated surface of the main scale and a guide rod being of a circle in cross section, solidly secured to the graduated surface of the main scale and guided in travel by the groove.

Further, one of the above described objects can be achieved by an arrangement according to the present invention that the groove is formed of a block made of Teflon solidly secured to the outer surface of the carriage.

Further, one of the above described objects can be achieved by an arrangement according to the present invention that in a displacement measuring instrument wherein the instrument comprises a reflecting type linear main scale and a carriage movable along the main scale having thereon mounted an index scale whose graduated surface is opposed through a minute space to a graduated surface of the main scale, and a value of relative displacement between the main scale and the carriage is measured from a variation in volume of a light emitted to the main scale and the index scale and reflected thereat due to the relative movement between the scales, travel guide mechanisms of the carriage includes: a first travel guide mechanism having sliders solidly secured to the carriage and slidable on the graduated surface of the main scale; and a second travel guide mechanism having a V-groove formed on the graduated surface of the main scale in the moving direction of the carriage and a guide rod being of a semicircle in cross section solidly secured to the outer surface of the carriage opposed to the graduated surface of the main scale and guided in travel by said V-groove.

Further, one of the above described objects can be achieved by an arrangement according to the present invention that the V-groove is formed on a surface of a scale base, on which the main scale is provided, the surface being in parallel with the graduated surface of the main scale.

Further, one of the above described objects can be achieved by an arrangement according to the present invention that the sliders are made of Teflon (a trademark).

Further, one of the above described objects can be achieved by an arrangement according to the present invention that the angle of aperture of the V-groove is 90°.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein;

FIG. 6 is a perspective view showing the essential portions of a third embodiment thereof; and FIG. 7 is a cross-sectional view taken along the line VII—VII in FIG. 6.

DETAILED DESCRIPTION OF THE INVENTION

Figure 1:
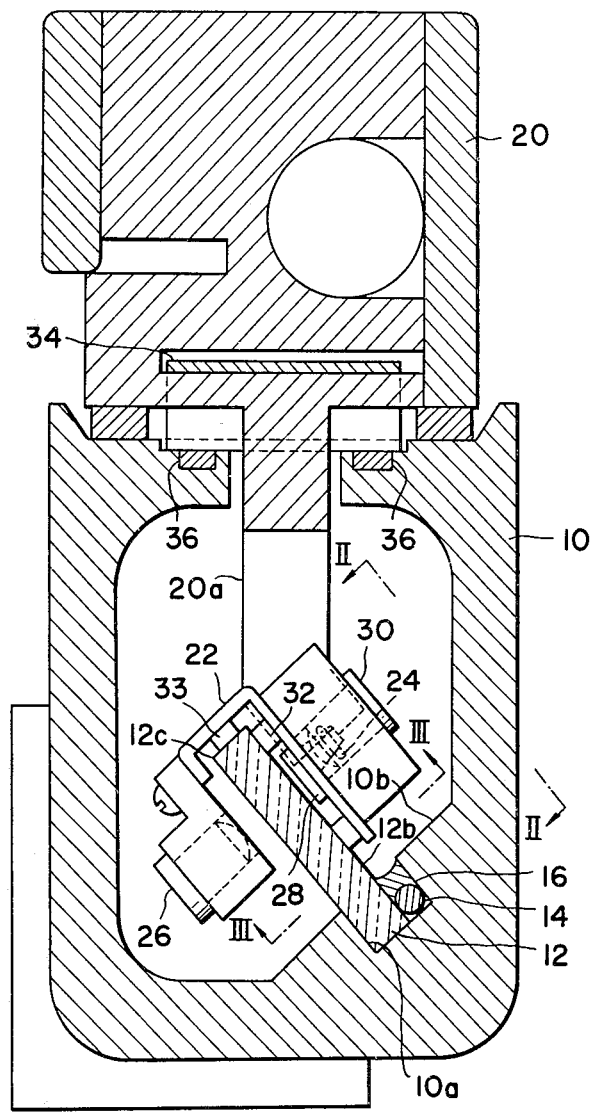
FIG. 1 is cross-sectional view showing an example of the conventional transmitting linear scale type displacement measuring instrument.
Figure 2:
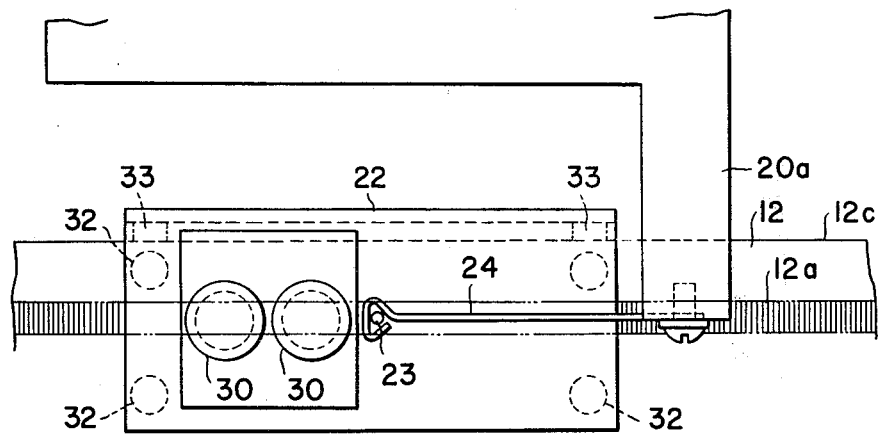
FIG. 2 is a longitudinal sectional view taken along the line II—II in FIG. 1.
Figure 3:
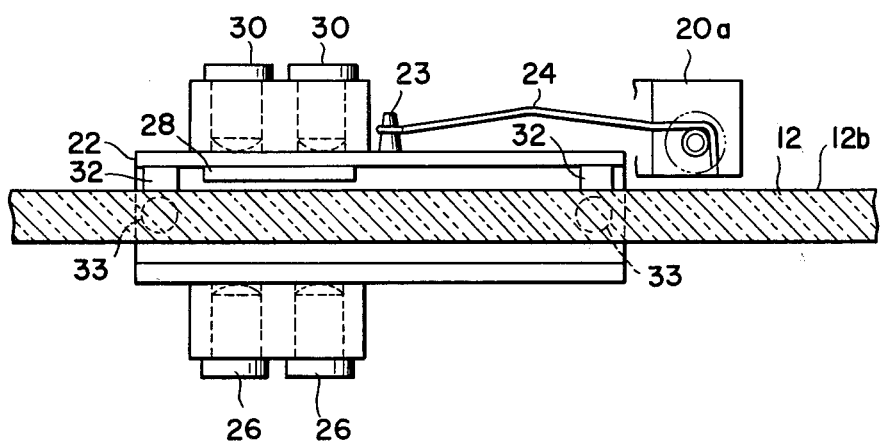
FIG. 3 is a longitudinal sectional view taken along the line III—III in FIG. 1.
Figure 4:
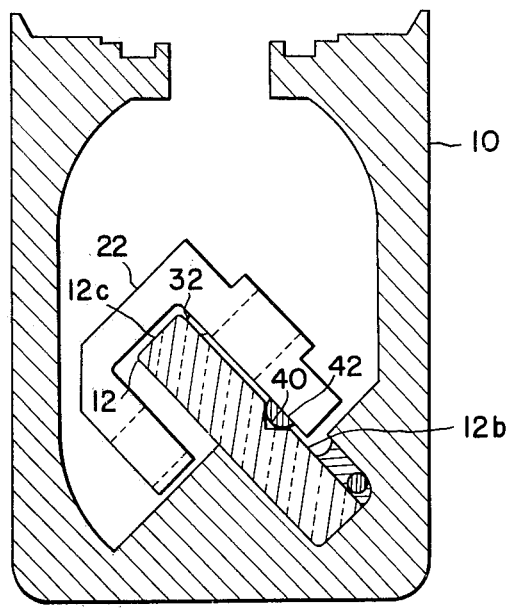
FIG. 4 is a cross-sectional view showing the arrangement of a first embodiment of the displacement measuring instrument according to the present invention.

Detailed description will hereunder be given of the embodiments of the present invention with reference to the drawings. In a first embodiment of the present invention, the present invention is applied to the transmitting linear scale type displacement measuring instrument similar to the conventional example. As shown in FIG. 4, part of the travel guide mechanisms of the carriage 22, which is connected to the arm of the detector similar to the conventional one through a cantilever spring and biased by the cantilever spring to the left and downward in the drawing, is constituted by sliders 32 similar to the conventional ones, made of Teflon for example, solidly secured to the carriage 22 and slinding on an upper portion of the graduated surface 12b of the transmitting type linear main scale 12, and at the same time, the rest of the travel guide mechanisms is constituted by a V-groove 40 having an angle of aperture of 90° and formed on the graduated surface 12b of the main scale 12 in the moving direction of the carriage 22 and a guide rod 42 being of a semicircle in cross section, solidly secured to the outer surface of the carriage 22 opposed to the graduated surface 12b of the main scale 12 and guided in travel by the aforesaid V-groove 40. Furthermore, the sliders sliding on the side face 12c of the main scale 12 are omitted. Other respects are similar to the aforesaid conventional example, so that detailed description will be omitted.

In this embodiment, the carriage 22 is biased by the cantilever spring in the direction of abutting against the graduated surface 12b of the main scale 12, and consequently, the carriage 22 is guided in travel by a combination of the sliders 32 similar to the conventional ones with the V-groove 40 and the guide rod 42 according to the present invention. Accordingly, a stabilized travel guide performance can be obtained without using the side face 12c of the main scale 12 as the scanning reference surface of the carriage 22.

Figure 5:
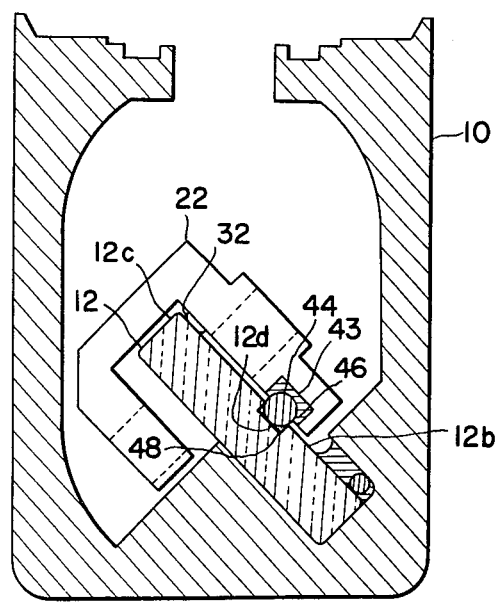
FIG. 5 is a cross-sectional view showing the arrangement of a second embodiment thereof.

FIG. 5 shows a second embodiment of the present invention. This embodiment is of such an arrangement that, in the transmitting linear scale type displacement measuring instrument similar to the conventional example, part of the travel guide mechanisms of the carriage 22 is constituted by sliders 32 similar to the conventional ones, made of Teflon (a trademark) for example, solidly secured to the carriage 22 and sliding on an upper portion of the graduated surface 12b of the transmitting type linear main scale 12, and at the same time, the rest of the travel guide mechanisms is constituted by a semicircular groove 44 formed in a block 43 made of Teflon, solidly secured to the outer surface of the carriage 22 opposed to the graduated surface 12b of the main scale 12, and a guide rod 46 being of a circle in cross section, solidly secured to the graduated surface 12b of the main scale 12 and guiding in travel the aforesaid semicircular groove 44. The guide rod 46 in this embodiment is half inserted into a groove 12d formed on the graduated surface 12b of the main scale 12, and solidly secured to the graduated surface 12b of the main scale 12 through a bonding agent 48 filled in the groove 12d. Other respects and action are similar to the first embodiment, so that detailed description will be omitted.

FIGS. 6 and 7 show a third embodiment of the present invention. In this embodiment, the present invention is applied to a reflecting linear scale type displacement measuring instrument wherein light emitting elements and photoelectric elements are disposed on the same side with respect to a reflecting type metallic linear main scale 50 and a value of relative movement between the main scale 50 and a carriage 52 is measured from a variation in volume of a reflected light reflected at the outer surface of the main scale 50. In this embodiment, part of the travel guide mechanisms of the carriage 52, which is connected to the arm 20a of the detector through the cantilever 24 and biased by the cantilever spring 24 in a direction of abutting against a graduated surface 50a of the main scale 50, is constituted by sliders 54 similar to the conventional ones, made of Teflon for example, and solidly secured to the carriage 52, and at the same time, the rest of the travel guide mechanisms is constituted by a V-groove 58 having an angle of aperture of 90° and formed on a surface of a scale base 56, on which the linear scale 50 is provided, the surface being in parallel with the graduated surface 50a of the linear scale 50, and a guide rod 60 being of a semicircle in cross section solidly secured to the outer surface of the carriage 52 opposed to the graduated surface 50a of the main scale 50. Other respects and functional effects are similar to the preceding embodiments, so that detailed description will be omitted.

Additionally, in each of the abovedescribed embodiments, the convex guide means in travel by the groove is rod-shaped, however, the convex guide means is not limited to this specific form, but may be rods divided in the longitudinal direction or semispheres.

Furthermore, in each of the abovedescribed embodiments, part of the travel guide mechanisms is constituted by the sliders and the rest thereof is constituted by the groove and the guide rod, however, the constitution of the travel guide mechanisms is not limited to this specific form, but such a constitution may be adoptable that, omitting the sliders, and instead, the travel guide mechanism including the groove and the guide rod according to the present invention is additionally introduced and the travel guide may be performed only by use of the travel guide mechanisms according to the present invention.

In each case of the abovedescribed embodiments, the present invention is applied to a linear scale type displacement measuring instrument in which the fringes of graduation of the index scale are made parallel to the fringes of graduation of the main scale, however, the scope of application of the present invention is not limited to this specific form, but the present invention may be apparently applied to a moire fringe type measuring instrument in which the fringes of graduation of the index scale are inclined to the fringes of graduation of the main scale as well.

It should be apparent to those skilled in the art that the abovedescribed embodiments are merely representative, which represent the applications of the principles of the present invention. Numerous and varied other arrangements can be readily devised by those skilled in the art without departing from the spirit and the scope of the invention.

What is claimed is:

1. A displacement measuring instrument wherein said instrument comprises a light transmitting type main scale which has a graduated surface, a carriage which is movable along said main scale and an index scale which is mounted on said carriage and has another graduated surface opposed to said graduated surface of said main scale through a minute space, and a value of relative displacement between said main scale and said carriage is measured from a variation in the intensity of light emitted to said main scale and said index scale and transmitted therethrough due to the relative movement between said scales, characterized in that a travel guide means for said carriage comprises:

a slider or sliders secured to said carriage and slidable on said graduated surface of said main scale;

a travel guide mechanism having a groove formed in the moving direction of said carriage adjacent to one of said graduated surfaces of said scales, said groove being formed adjacent said slider(s) with the graduation of said scale therebetween;

convex guide means secured to the surface opposed to said groove and guided in travel by said groove; and a biasing means for urging said carriage against said main scale;

whereby the space formed between said two scales is maintained by said slider(s) and said travel guide mechanism, and the positional relationship between said two scales in the widthwise direction of said main scale is maintained by said travel guide mechanism.

2. A displacement measuring instrument wherein said instrument comprises a light transmitting type linear main scale which has a graduated surface, a carriage which is movable along said main scale and an index scale which is mounted on said carriage and has another graduated surface opposed to said graduated surface of said main scale through a minute space, and a value of relative displacement between said main scale and said carriage is measured from a variation in the intensity of light emitted to said main scale and said index scale and trasmitted therethrough due to the relative movement between said scales, characterized in that a travel guide means for said carriage comprises:

a slider or sliders secured to said carriage and slidable on said graduated surface of said main scale;

a travel guide mechanism having a V-groove formed in the moving direction of said carriage on said graduated surface of said main scale, said groove being formed adjacent said slider(s) with the graduation of said main scale therebetween;

a guide rod being of a semicircle in cross-section secured to a surface of said carriage opposed to said graduated surface of said main scale and guided in travel by said V-groove; and a biasing means for urging said carriage against said main scale;

whereby the space formed between said two scales is maintained by said slider(s) and said travel guide mechanism, and the positional relationship between said two scales in the widthwise direction of said main scale is maintained by said travel guide mechanism.

3. A displacement measuring instrument wherein said instrument comprises a light transmitting type linear main scale which has a graduated surface, a carriage which is movable along said main scale and an index scale which is mounted on said carriage and has another graduated surface opposed to said graduated surface of said main scale through a minute space, and a value of relative displacement between said main scale and said carriage is measured from a variation in the intensity of light emitted to said main scale and said index scale and transmitted therethrough due to the relative movement between said scales, characterized in that a travel guide means for said carriage comprises:

a slider or sliders secured to said carriage and slidable on said graduated surface of said main scale;

a travel guide mechanism having a groove being of a semicircle in cross section formed in the moving direction of said carriage on a surface of said carriage opposed to said graduated surface of said main scale, said groove being formed adjacent said slider(s) with the graduation of said index scale therebetween;

a guide rod being of a circle in cross section secured to said graduated surface of said main scale and guide in travel by said groove; and a biasing means for urging said carriage against said main scale;

whereby the space formed between said two scales is maintained by said slider(s) and said travel guide mechanism, and the positional relationship between said two scales in the widthwise direction of said main scale is maintained by said travel guide mechanism.

4. Displacement measuring instrument as set forth in claim 6, wherein said guide rod is half inserted into a groove formed on said graduated surface of said main scale, and solidly secured to said graduated surface of said main scale through a bonding agent filled in said groove.

5. A displacement measuring instrument as set forth in claim 3, wherein said groove is formed of a block made of TEFLON (a trademark) secured to said outer surface of said carriage.

6. A displacement measuring instrument wherein said instrument comprises a light reflecting type main scale which has a graduated surface, a carriage which is movable along said main scale and an index scale which is mounted on said carriage and has another graduated surface opposed to said graduated surface of said main scale through a minute space, and a value of relative displacement between said main scale and said carriage is measured from a variation in the intensity of light emitted to said main scale and said index scale and reflected thereat due to the relative movement between said scales, characterized in that a travel guide means for said carriage comprises:

a slider or sliders secured to said carriage and slidable on said graduated surface of said main scale;

a travel guide mechanism having a groove formed in the moving direction of said carriage on said graduated surface of said main scale, said groove being formed adjacent said slider(s) with the graduation of said main scale therebetween;

convex guide means secured to the surface opposed to said groove and guided in travel by said groove; and a biasing means for urging said carriage against said main scale;

whereby the space formed between said two scales is maintained by said slider(s) and said travel guide mechanism, and the positional relationship between said two scales in the widthwise direction of said main scale is maintained by said travel guide mechanism.

7. A displacement measuring instrument as set forth in claims 2, 3 or 6, wherein said sliders are made of TEFLON (a trademark).

8. A displacement measuring instrument as set forth in claims 5 or 6, wherein the angle of aperture of said V-groove is 90°.

9. A displacement measuring instrument as set forth in claim 6, wherein said groove is a V-groove formed on said graduated surface of said main scale and said convex guide means is a guide rod being of a semicircle in cross section secured to a surface of said carriage opposed to said graduated surface of said main scale.

* * * * *